United States Patent
Ye et al.

(10) Patent No.: US 8,654,553 B1
(45) Date of Patent: Feb. 18, 2014

(54) ADAPTIVE DIGITAL CONTROL OF POWER FACTOR CORRECTION FRONT END

(71) Applicant: Flextronics AP, LLC, Broomfield, CO (US)

(72) Inventors: Zhen Z. Ye, Garland, TX (US); Jamie Dunn, Plano, TX (US)

(73) Assignee: Flextronics AP, LLC, Broomfield, CO (US)

( * ) Notice: Subject to any disclaimer, the term of this patent is extended or adjusted under 35 U.S.C. 154(b) by 0 days.

(21) Appl. No.: 13/835,781

(22) Filed: Mar. 15, 2013

(51) Int. Cl.
*H02M 5/42* (2006.01)

(52) U.S. Cl.
USPC ............................................. 363/89; 323/207

(58) Field of Classification Search
USPC ......... 363/40, 84, 88, 89, 90, 95, 97; 323/207
See application file for complete search history.

(56) References Cited

U.S. PATENT DOCUMENTS

| | | | |
|---|---|---|---|
| 4,273,406 A | 6/1981 | Okagami | |
| 4,370,703 A | 1/1983 | Risberg | |
| 4,563,731 A | 1/1986 | Sato et al. | |
| 4,645,278 A | 2/1987 | Yevak et al. | |
| 4,712,160 A | 12/1987 | Sato et al. | |
| 4,788,626 A | 11/1988 | Neidig et al. | |
| 4,806,110 A | 2/1989 | Lindeman | |
| 4,841,220 A | 6/1989 | Tabisz et al. | |
| 4,857,822 A | 8/1989 | Tabisz et al. | |
| 4,866,367 A | 9/1989 | Ridley et al. | |
| 4,890,217 A | 12/1989 | Conway | |
| 4,893,227 A | 1/1990 | Gallios et al. | |
| 4,899,256 A | 2/1990 | Sway-Tin | |
| 4,901,069 A | 2/1990 | Veneruso | |
| 5,065,302 A | 11/1991 | Kanazawa | |
| 5,090,919 A | 2/1992 | Tsuji | |
| 5,101,322 A | 3/1992 | Ghaem et al. | |
| 5,132,890 A | 7/1992 | Blandino | |
| 5,235,491 A | 8/1993 | Weiss | |
| 5,325,283 A | 6/1994 | Farrington | |

(Continued)

FOREIGN PATENT DOCUMENTS

| | | |
|---|---|---|
| JP | 4217869 A | 8/1992 |
| JP | 10243640 A | 9/1998 |

(Continued)

OTHER PUBLICATIONS

EE Times.com—"Team Claims Midrange Wireless Energy Transfer", by R. Colin Johnson, 4 pages, Nov. 6, 2007.

(Continued)

*Primary Examiner* — Nguyen Tran
(74) *Attorney, Agent, or Firm* — Haverstock & Owens LLP

(57) ABSTRACT

A method is directed to providing adaptive digital control for the PFC front-end of a switching mode power supply. The method uses an evaluation model to adjust control loop parameters of a control algorithm used by a controller on the primary side of the power supply. The method performs a series of step adjustments of the control loop parameter values to determine optimized values. In some implementations, the method determines and compares the line current THD corresponding to different control loop parameter values. The method provides simplified digital control loop design, optimizes PFC front-end performance, improves system efficiency by decreasing harmonic ripples, and reduces labor cost and time to market due to shorter research and development phase. System performance optimization is fully adaptive adjusted for changes in operating conditions due to, for example, environmental and temperature variations.

26 Claims, 2 Drawing Sheets

(56) References Cited

U.S. PATENT DOCUMENTS

| | | | |
|---|---|---|---|
| 5,365,403 A | 11/1994 | Vinciarelli et al. | |
| 5,373,432 A | 12/1994 | Vollin | |
| 5,442,540 A | 8/1995 | Hua | |
| 5,673,185 A | 9/1997 | Albach et al. | |
| 5,712,772 A | 1/1998 | Telefus et al. | |
| 5,786,992 A | 7/1998 | Vinciarelli et al. | |
| 5,790,395 A | 8/1998 | Hagen | |
| 5,811,895 A | 9/1998 | Suzuki et al. | |
| 5,838,554 A | 11/1998 | Lanni | |
| 5,859,771 A | 1/1999 | Kniegl | |
| 5,905,369 A | 5/1999 | Ishii et al. | |
| 5,923,543 A | 7/1999 | Choi | |
| 5,949,672 A | 9/1999 | Bertnet | |
| 5,978,238 A | 11/1999 | Liu | |
| 6,009,008 A | 12/1999 | Pelly | |
| 6,091,611 A | 7/2000 | Lanni | |
| 6,183,302 B1 | 2/2001 | Daikuhara et al. | |
| 6,191,957 B1 | 2/2001 | Peterson | |
| 6,272,015 B1 | 8/2001 | Mangtani | |
| 6,275,397 B1 | 8/2001 | McClain | |
| 6,307,761 B1 | 10/2001 | Nakagawa | |
| 6,323,627 B1 | 11/2001 | Schmiederer et al. | |
| 6,385,059 B1 | 5/2002 | Telefus et al. | |
| 6,388,897 B1 | 5/2002 | Ying et al. | |
| 6,390,854 B2 | 5/2002 | Yamamoto et al. | |
| 6,396,716 B1 | 5/2002 | Liu et al. | |
| 6,452,816 B2 | 9/2002 | Kuranki | |
| 6,459,175 B1 | 10/2002 | Potega | |
| 6,487,098 B2 | 11/2002 | Malik et al. | |
| 6,549,409 B1 | 4/2003 | Saxelby et al. | |
| 6,578,253 B1 | 6/2003 | Herbert | |
| 6,721,192 B1 | 4/2004 | Yang et al. | |
| 6,775,162 B2 | 8/2004 | Mihai et al. | |
| 6,894,461 B1 | 5/2005 | Hack et al. | |
| 6,919,715 B2 | 7/2005 | Muratov et al. | |
| 6,989,997 B2 | 1/2006 | Xu | |
| 7,035,126 B1 | 4/2006 | Lanni | |
| 7,038,406 B2 | 5/2006 | Wilson | |
| 7,102,251 B2 | 9/2006 | West | |
| 7,139,180 B1 | 11/2006 | Herbert | |
| 7,202,640 B2 | 4/2007 | Morita | |
| 7,208,833 B2 | 4/2007 | Nobori et al. | |
| 7,212,420 B2 | 5/2007 | Liao | |
| 7,239,532 B1 | 7/2007 | Hsu et al. | |
| 7,274,175 B2 | 9/2007 | Manolescu | |
| 7,315,460 B2 | 1/2008 | Kyono | |
| 7,386,286 B2 | 6/2008 | Petrovic et al. | |
| 7,450,388 B2 | 11/2008 | Beihoff et al. | |
| 7,564,706 B1 | 7/2009 | Herbert | |
| 7,596,007 B2 | 9/2009 | Phadke | |
| 7,701,305 B2 | 4/2010 | Lin et al. | |
| 7,830,684 B2 | 11/2010 | Taylor | |
| 7,924,578 B2 | 4/2011 | Jansen et al. | |
| 8,059,434 B2 | 11/2011 | Huang et al. | |
| 8,102,678 B2 | 1/2012 | Jungreis | |
| 8,126,181 B2 | 2/2012 | Yamamoto et al. | |
| 8,130,522 B2 * | 3/2012 | Maksimovic | 363/89 |
| 8,134,848 B2 | 3/2012 | Whittam et al. | |
| 8,155,368 B2 | 4/2012 | Cheung et al. | |
| 8,194,417 B2 | 6/2012 | Chang | |
| 8,207,717 B2 | 6/2012 | Urono et al. | |
| 8,213,200 B2 * | 7/2012 | Shimizu | 363/89 |
| 8,228,696 B2 * | 7/2012 | Uno | 363/89 |
| 8,243,472 B2 | 8/2012 | Chang et al. | |
| 8,369,111 B2 | 2/2013 | Balakrishnan et al. | |
| 8,400,801 B2 | 3/2013 | Shinoda | |
| 2002/0008963 A1 | 1/2002 | Dibene et al. | |
| 2002/0011823 A1 | 1/2002 | Lee | |
| 2002/0036200 A1 | 3/2002 | Ulrich | |
| 2003/0035303 A1 | 2/2003 | Balakrishnan et al. | |
| 2003/0112645 A1 | 6/2003 | Schlecht | |
| 2004/0183510 A1 | 9/2004 | Sutardja et al. | |
| 2004/0255259 A1 | 12/2004 | Tan et al. | |
| 2005/0024016 A1 | 2/2005 | Breen et al. | |
| 2005/0036338 A1 | 2/2005 | Porter et al. | |
| 2005/0117376 A1 | 6/2005 | Wilson | |
| 2005/0138437 A1 | 6/2005 | Allen et al. | |
| 2005/0194942 A1 | 9/2005 | Hack et al. | |
| 2005/0225257 A1 | 10/2005 | Green | |
| 2005/0254268 A1 | 11/2005 | Reinhard et al. | |
| 2006/0002155 A1 | 1/2006 | Shteynberg et al. | |
| 2006/0022637 A1 | 2/2006 | Wang et al. | |
| 2006/0152947 A1 | 7/2006 | Baker et al. | |
| 2006/0213890 A1 | 9/2006 | Kooken et al. | |
| 2006/0232220 A1 | 10/2006 | Melis | |
| 2007/0040516 A1 | 2/2007 | Chen | |
| 2007/0120542 A1 | 5/2007 | LeMay | |
| 2007/0121981 A1 | 5/2007 | Koh et al. | |
| 2007/0138971 A1 | 6/2007 | Chen | |
| 2007/0247091 A1 | 10/2007 | Maiocchi | |
| 2007/0263415 A1 | 11/2007 | Jansen et al. | |
| 2008/0018265 A1 | 1/2008 | Lee et al. | |
| 2008/0043496 A1 | 2/2008 | Yang | |
| 2008/0191667 A1 | 8/2008 | Kernahan et al. | |
| 2009/0034299 A1 | 2/2009 | Lev | |
| 2009/0045889 A1 | 2/2009 | Goergen et al. | |
| 2009/0196073 A1 | 8/2009 | Nakahori | |
| 2009/0290384 A1 | 11/2009 | Jungreis | |
| 2010/0039833 A1 | 2/2010 | Coulson et al. | |
| 2010/0289466 A1 | 11/2010 | Telefus et al. | |
| 2010/0322441 A1 | 12/2010 | Weiss et al. | |
| 2011/0132899 A1 | 6/2011 | Shimomugi et al. | |
| 2011/0261590 A1 | 10/2011 | Liu | |
| 2012/0112657 A1 | 5/2012 | Van Der Veen et al. | |

FOREIGN PATENT DOCUMENTS

| | | |
|---|---|---|
| JP | 2000083374 A | 3/2000 |
| JP | 20000253648 A | 9/2000 |
| JP | 2004208357 A | 7/2004 |

OTHER PUBLICATIONS

EE Times.com—"Wireless Beacon Could Recharge Consumer Devices", by R. Colin Johnson, 3 pages, Nov. 6, 2007.

Novel Zero-Voltage and Zero-Current Switching (ZVZCS) Full Bridge PWM converter Using Coupled Output Inductor, Sep. 2002 IEEE, pp. 641-648.

"New Architectures for Radio-Frequency dc/dc Power Conversion", Juan Rivas et al., Laboratory for Electromagnetic and Electronic Systems, Jan. 2004, Massachusetts Institute of Technology, Room 10-171 Cambridge, MA 02139, pp. 4074-4084.

"Randomized Modulation in Power Electronic Converters". Aleksander M. Stankovic, member IEEE, and Hanoch Lev-Ari, vol. 90, No. 5, May 2002, pp. 782-799.

"Analysis and Special Characteristics of a Spread-Spectrum Technique for Conducted EMI Suppression", K.K. tse, et al. Member IEEE, IEEE Transactions on Power Electronics, vol. 15., No. 2, Mar. 2000, pp. 399-410.

"Practical on-Line Identification of Power Converter Dynamic Respones", Botao Miao et al., Colorado Power Electronics Center, ECE Department, 2005, pp. 57-62.

"A Modified Cross-Correlation Method for System Identification of Power Converters with Digital Control", Botao Miao et al., Colorado Power Electronics Center, ECE Department, 2004, pp. 3728-3733.

"Design and Implementation of an Adaptive Tuning System Based on Desired Phase Margin for Digitally Controlled DC-DC Converters", Jeffrey Morroni et al., Member IEEE, 2009, pp. 559-564.

* cited by examiner

ADAPTIVE DIGITAL CONTROL OF POWER FACTOR CORRECTION FRONT END

FIELD OF THE INVENTION

The present invention is generally directed to the field of power supplies. More specifically, the present invention is directed to providing adaptive digital control of the power factor correction front end of a switching mode power supply.

BACKGROUND OF THE INVENTION

A power supply unit converts main AC voltage to one or more regulated DC voltages supplied to one or more loads, such as the internal components of a computer, server, or other electrical device. A digitally controlled switching mode power supply unit typically includes a primary side for power factor correction (PFC) and AC-to-DC voltage conversion, and a secondary side for DC-to-DC voltage conversion. The primary side is under control of a first digital signal controller (DSC) and the secondary side is under control of a separate second DSC or a digital control chip.

Adaptive control is a control method used by a controller which must adapt to a controlled system with parameters which vary, or are initially not optimized. Applying adaptive control to switching mode power supplies improves system performance. However, due to the non-linearity of the power train circuitry to be controlled, designing control parameters used in such an adaptive control is challenging.

One conventional approach for designing a loop controller for a switching mode power supply is to initially design control loop parameters based on a small signal model and Bodeplot. There is a separate small signal model for the primary side and the secondary side. Small signal modeling is a common analysis technique used to approximate the behavior of nonlinear devices with linear equations. In this manner, the power supply can be modeled using a mathematical model. Stability theory is then applied to design the digital controller in order to ensure that the switched mode power supply operates with sufficient phase margin and gain margin. In other words, the loop controller is designed to ensure that the power supply can operate at both steady state condition and transient state condition. The designed control loop parameters are finalized by trial and error, which is extremely time consuming, such as ranging from a couple of days to a few weeks. Additionally, the system performance is still subject to temperature and environment changes, which result in changes to the control loop parameters. As such, optimized performance can not be achieved as operating conditions change.

Another approach for designing the loop controller for a switching mode power supply is based on a system identification technique. The system identification technique adds functionality to the second DSC on the secondary side of the power supply. The second DSC is configured to determine system characteristics of the switching mode power supply under the current operating condition and to then adjust the control loop parameters according to the determined system characteristics. Parameters of the secondary-side small signal model are identified and then the parameters of the secondary-side loop controller are adjusted accordingly. To determine the system characteristics, such as the transfer function of the small signal model, white noise is injected into the power supply. The second DSC calculates the variance and covariance resulting from the injected noise to determine the system characteristics. Proper control loop parameters are calculated using the determined system characteristics, and these calculated control loop parameters replace the previous control loop parameters in the small signal model used by the second DSC. However, it is impractical to implement the system identification technique in a functioning power supply since injecting white noise can impact the stability of the system and even damage the power supply. Further, implementation of the system identification technique results in significant signal processing burden which requires a more powerful and expensive second DSC.

SUMMARY OF THE INVENTION

A method is directed to providing adaptive digital control for the PFC stage or front-end of a switching mode power supply. The method uses an evaluation model to adjust the control loop parameters of the control algorithm used by a controller on the primary side of the power supply. The method performs a series of step adjustments of the control loop parameter values to determine optimized values. In some embodiments, the method determines and compares the line current THD corresponding to different control loop parameter values. The method provides simplified digital control loop design, optimizes PFC front-end performance, improves system efficiency by decreasing harmonic ripples, and reduces labor cost and time to market due to shorter research and development phase. System performance optimization is fully adaptive adjusted for changes in operating conditions due to, for example, environmental and temperature variations.

In an aspect, a method of adaptively controlling a power supply is disclosed. The method includes configuring a switching mode power supply to include a transformer having a primary side and a secondary side, a primary side circuit under control of a primary side controller and a secondary side circuit under control of a secondary side controller, wherein the primary side controller controls the primary side circuit using a control algorithm that includes control loop parameters. The method also includes setting the control loop parameters to default control loop parameter values, and determining line current total harmonic distortion corresponding to the default control loop parameter values. The method also includes adjusting the control loop parameters, and determining line current total harmonic distortion corresponding to the adjusted control loop parameters. The method also includes comparing the line current total harmonic distortion corresponding to the adjusted control loop parameters to the line current total harmonic distortion corresponding to the default control loop parameter values to determine a lowest line current total harmonic distortion. The method also includes setting optimized control loop parameters using the control loop parameters corresponding to the lowest line current total harmonic distortion, and executing the control algorithm using the optimized control loop parameters.

Determining line current total harmonic distortion can include measuring a line current and applying a Fast Fourier Transform to the measured line current. Determining line current total harmonic distortion can further include performing a power spectral density analysis on the Fast Fourier Transform result. Alternatively, determining line current total harmonic distortion can include passing a line current through a set of band pass filters. Adjusting the control loop parameters can include increasing or decreasing each control loop parameter by a predefined increment. The primary side circuit can be configured for power factor correction and AC-to-DC voltage conversion. The secondary side circuit can be configured for DC-to-DC voltage conversion.

In another aspect, another method of adaptively controlling a power supply is disclosed. The method includes configuring a switching mode power supply to include a transformer having a primary side and a secondary side, a primary side circuit under control of a primary side controller and a secondary side circuit under control of a secondary side controller, wherein the primary side controller controls the primary side circuit using a control algorithm that includes control loop parameters. The method also includes setting the control loop parameters to default control loop parameter values, and determining line current total harmonic distortion corresponding to the default control loop parameter values. The method also includes adjusting the control loop parameters, and determining line current total harmonic distortion corresponding to the adjusted control loop parameters. The method also includes comparing the line current total harmonic distortion corresponding to the adjusted control loop parameters to the line current total harmonic distortion corresponding to the default control loop parameter values to determine a lowest line current total harmonic distortion. The method also includes setting improved control loop parameters using the control loop parameters corresponding to the lowest line current total harmonic distortion. The method also includes performing one or more iterations of adjusting the improved control loop parameters for a present iteration, determining a resulting line current total harmonic distortion corresponding to the present iteration, comparing the resulting line current total harmonic distortion of the present iteration to the determined line current total harmonic distortion corresponding to the improved control loop parameters of a previous iteration, and resetting the improved control loop parameters using the control loop parameters corresponding to the lowest line current total harmonic distortion, wherein the one or more iterations are repeated until an optimized criteria is achieved and the improved control loop parameters are set as optimized control loop parameters. The method also includes executing the control algorithm using the optimized control loop parameters.

Determining line current total harmonic distortion can include measuring a line current and applying a Fast Fourier Transform to the measured line current. Determining line current total harmonic distortion can further include performing a power spectral density analysis on the Fast Fourier Transform result. Alternatively, determining line current total harmonic distortion can include passing a line current through a set of band pass filters. The optimized criteria can include determining that the determined line current total harmonic distortion is less than a line current total harmonic distortion minimum threshold value. Adjusting the improved control loop parameters for the present iteration can include increasing or decreasing each improved control loop parameter by a predefined increment. The optimized criteria can be achieved when a minimum line current total harmonic distortion is determined through successive incrementing and decrementing of the improved control loop parameters. Adjusting the control loop parameters can include increasing or decreasing each control loop parameter by a predefined increment. The primary side circuit can be configured for power factor correction and AC-to-DC voltage conversion. The secondary side circuit can be configured for DC-to-DC voltage conversion.

In yet another aspect, an apparatus for adaptively controlling a power supply is disclosed. The apparatus includes a switching mode power supply with a transformer having a primary side circuit and a secondary side circuit, and a primary side controller configured to control the primary side circuit using a control algorithm that includes control loop parameters. The control algorithm is configured to set the control loop parameters to default control loop parameter values, and to determine line current total harmonic distortion corresponding to the default control loop parameter values. The control algorithm is also configured to adjust the control loop parameters, and determine line current total harmonic distortion corresponding to the adjusted control loop parameters. The control algorithm is also configured to compare the line current total harmonic distortion corresponding to the adjusted control loop parameters to the line current total harmonic distortion corresponding to the default control loop parameter values to determine a lowest line current total harmonic distortion. The control algorithm is also configured to set optimized control loop parameters using the control loop parameters corresponding to the lowest line current total harmonic distortion, and execute the control algorithm using the optimized control loop parameters.

The apparatus also includes a secondary side controller configured to control the secondary side circuit. The control algorithm can be further configured to perform one or more iterations of adjusting the improved control loop parameters for a present iteration, determine a resulting line current total harmonic distortion corresponding to the present iteration, compare the resulting line current total harmonic distortion of the present iteration to the determined line current total harmonic distortion corresponding to the improved control loop parameters of a previous iteration, and reset the improved control loop parameters using the control loop parameters corresponding to the lowest line current total harmonic distortion, wherein the one or more iterations are repeated until an optimized criteria is achieved and the improved control loop parameters are set as optimized control loop parameters. The primary side controller can be configured to determine line current total harmonic distortion by measuring a line current and applying a Fast Fourier Transform to the measured line current. The primary side controller can be further configured to perform a power spectral density analysis on the Fast Fourier Transform result. Alternatively, the apparatus can also include a set of band pass filters and the primary side controller can be further configured to determine line current total harmonic distortion by passing a line current through the set of band pass filters. The primary side controller can be configured to adjust the control loop parameters by increasing or decreasing each control loop parameter by a predefined increment. The primary side circuit can be configured for power factor correction and AC-to-DC voltage conversion. The secondary side circuit can be configured for DC-to-DC voltage conversion.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a method of adaptive digital control of the power factor correction front end of a switching mode power supply. Those of ordinary skill in the art will realize that the following detailed description of the method is illustrative only and is not intended to be in any way limiting. Other embodiments of the method will readily suggest themselves to such skilled persons having the benefit of this disclosure.

Reference will now be made in detail to implementations of the method as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
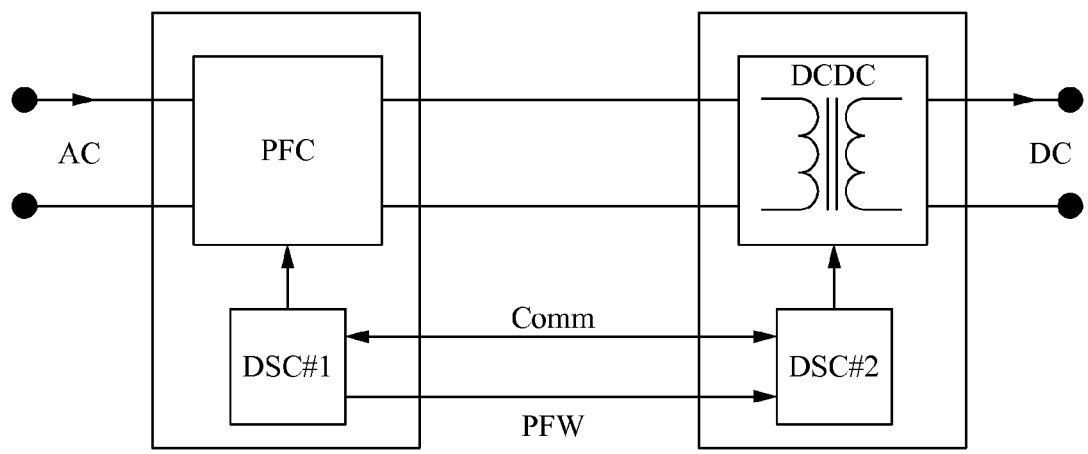
FIG. 1 illustrates a switching mode power supply unit under digital control for supplying power to a load according to an embodiment.

FIG. 1 illustrates a switching mode power supply unit under digital control for supplying power to a load according to an embodiment. The power supply unit includes a primary side for power factor correction (PFC) and AC-to-DC voltage conversion, and a secondary side for DC-to-DC voltage conversion. The primary side receives an AC input voltage, such as the main line AC voltage, and outputs a DC bus voltage, such as 400V. The secondary side converts the DC bus voltage output from the primary side to a desired DC voltage level that is used by a coupled load, such as 15V, 5V, or 3.3V. The PFC stage on the primary side is digitally controlled by a first DSC. The DC-to-DC stage on the secondary side is digitally controlled by a second DSC. There is bi-directional or unidirectional communication signals sent between the first DSC and the second DSC.

Figure 2:
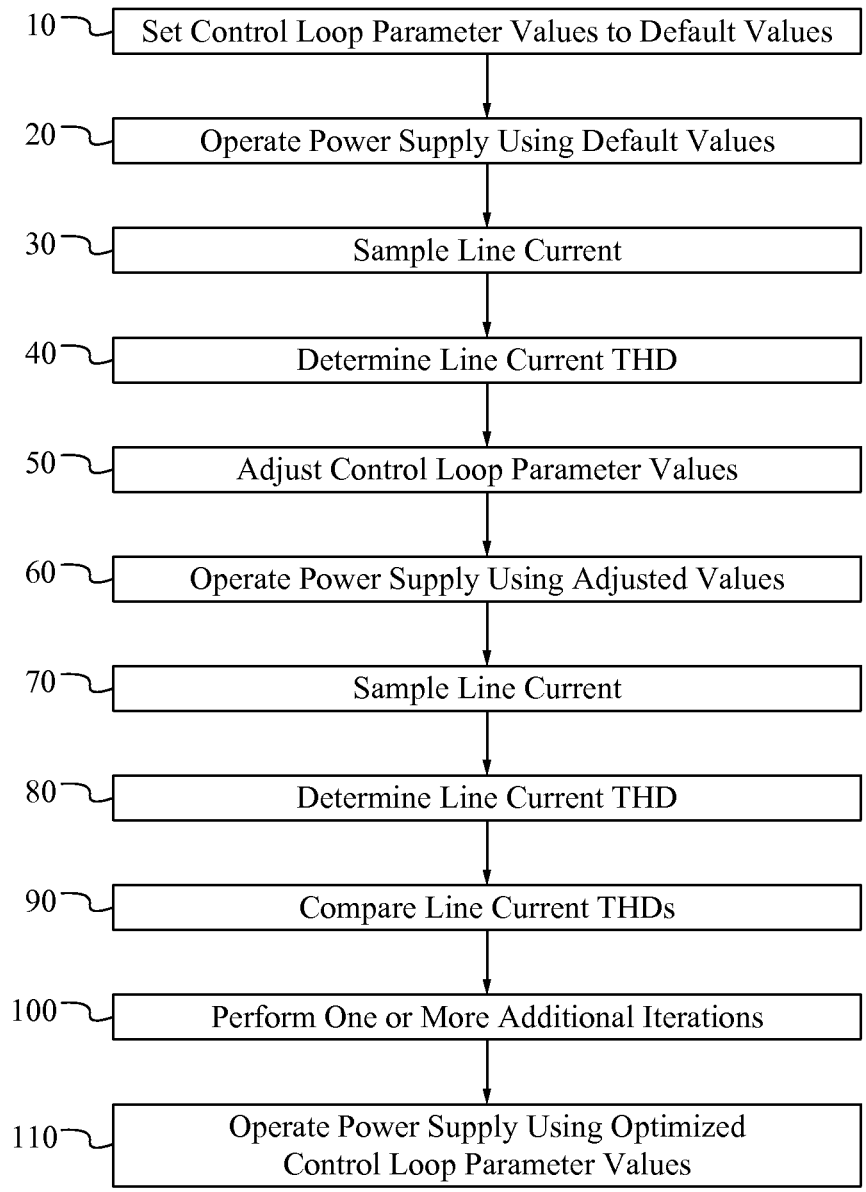
FIG. 2 illustrates a method of adaptively controlling the power supply unit through execution of the control algorithm by the first DSC, or other primary side controller, according to an embodiment.

The first DSC includes a control algorithm which when executed provides a method of adaptive digital control of the PFC front end of the switching mode power supply unit. In some embodiments, the method optimizes system performance by minimizing line current total harmonic distortion (THD). FIG. 2 illustrates a method of adaptively controlling the power supply unit through execution of the control algorithm by the first DSC, or other primary side controller. The control algorithm includes control loop parameters having numerical values which are stored and retrieved by the first DSC when executing the control algorithm. At the step 10, the control loop parameters are initialized to default values. At the step 20, the power supply is operated under control of first DSC with the control loop parameters set at the default values. At the step 30, while operating in normal, or steady-state, the line current is sampled by the first DSC. Normal state is that state where the power supply operates within predefined operating parameters, for example, no over voltage, no over current, and no over temperature.

At the step 40, the sampled line current is processed by the first DSC to determine the line current THD. The line current THD determined at this step corresponds to the default values of the control loop parameters. The line current can be processed either in firmware or hardware. In some embodiments, a Fast Fourier Transform is applied to the sampled line current to generate the fundamental line current component and corresponding harmonics, referred to in whole as the line current THD. An additional power spectral density analysis can performed on the Fast Fourier Transform result, although typically the Fast Fourier Transform result is sufficient. Power spectral density, which represents a measurement of the energy at various frequencies by using complex conjugate, is analyzed after the Fast Fourier Transform for helping identify harmonics in cases of quite noisy environment. In other embodiments, a set of band pass filters are used and the line current is passed through the band pass filters to generate the line current THD. Setting the control loop parameters to the default values, sampling the line current, and determining the line current THD corresponding to the control loop parameter default values corresponds to a first iteration of the control algorithm. The control algorithm is configured as an evaluation model where the control loop parameters are systematically adjusted and the resulting line current THD is evaluated to arrive at optimized values. The control algorithm performs multiple iterations of setting the control loop parameter values, sampling the line current, and determining the line current THD corresponding to the set control loop parameter values for the present iteration. The line current THD for the present iteration is compared to the line current THD from the previous iteration to determine the better control loop parameter values. In some embodiments, the lower line current THD is considered to be the better configuration, and the corresponding control loop parameter values are considered to be the better values. Additional iterations determine better and better control loop parameter values until a defined criteria is reached or the lowest line current THD is found.

After the first iteration is completed at the step 40, the control loop parameter values are adjusted at the step 50. In order to avoid unstable operation of the power supply from adaptive control loop parameters, reasonable parameter boundaries are set for safe operation during parameter adjustments. Many different techniques can be used to systematically adjust the control loop parameter values until optimized values are determined. In some embodiments, each of the control loop parameter values is incremented and/or decremented by a defined interval value, such as in a mountain-climbing interval technique. In an exemplary implementation, each of the control loop parameter values is initially incremented by a predefined interval value. The interval value can be the same for each control loop parameter, or the interval value can be different from parameter to parameter. In this exemplary implementation, the initial adjustment is an increment. Alternatively, the initial adjustment for each control loop parameter value can be a decrement. Still alternatively, the initial adjustment can be an increment for some control loop parameters, and a decrement for other control loop parameters.

At the step 60, the power supply is operated under control of first DSC with the control loop parameters set at the adjusted values, as set at the step 50. At the step 70, while operating in normal state, the line current is sampled by the first DSC. At the step 80, the sampled line current is processed by the first DSC to determine the line current THD. The line current THD determined at this step corresponds to the adjusted values of the control loop parameters set during the present iteration, which at this stage is the second iteration.

At the step 90, the first iteration line current THD determined at the step 40 is compared to the second iteration line current THD determined at the step 80. The comparison determines which control loop parameter values result in the better configuration. In this exemplary implementation, the lower line current THD is considered to be the better configuration. If the line current THD corresponding to the first iteration is considered the better configuration, then the control loop parameter values are set at the default values. If the line current THD corresponding to the second iteration is considered the better configuration, then the control loop parameter values are set at the adjusted values, as in the step 50. In this manner, the control loop parameter values are optimized to either the default values or the adjusted values. At the step 100, one or more optional additional iterations can be performed to further optimize the control loop parameter values. Each additional iteration includes further adjusting the control loop parameter values, sampling the line current while operating in the normal state, determining the line current THD, and comparing the line current THD of the present iteration to the line current THD corresponding to the better configuration determined in the previous iteration.

If an additional iteration is to be performed, it is determined whether the control loop parameter values are to be incremented or decremented. If the most recent iteration, for example the second iteration, was determined to be the better configuration compared to the preceding iteration, for example the first iteration, then the control loop parameter values are adjusted in the same direction as the most recent iteration. For example, if the control loop parameter values were incremented in the second iteration, and the second iteration had the better configuration, then for the third iteration the control loop parameter values are again incremented. The line current is then sampled while the system operates in the normal state, the line current THD is determined and compared to the previous iteration. It is understood, that the "previous iteration" and the line current THD and control loop parameter values corresponding to the previous iteration refer to the determined better configuration, such that the present iteration is compared to the better configuration determined in the previous iteration. Subsequent iterations will continue to adjust the control loop parameter values in this same direction until the line current THD is not improved.

In the case where the second iteration does not result in an improved line current THD as compared to the first iteration, then for the third iteration the control loop parameter values are adjusted in the opposite direction as the adjustments made in the second iteration. For example, if the control loop parameter values were incremented in the second iteration, and the first iteration had the better configuration, then for the third iteration the control loop parameter values are decremented. The line current THD corresponds to the third iteration is compared to the line current THD of the first iteration, as in this case the better configuration from the "previous iteration" corresponds to the control loop parameter values and line current THD of the first iteration. If the line current THD corresponding to the third iteration is improved compared to the line current THD from the first iteration, then subsequent iterations will continue to adjust the control loop parameter values in this same direction, decrements in this case, until the line current THD is not improved.

In some embodiments, the additional iterations are performed with the increment or decrement adjustments made in the same direction, as described above, until a present iteration fails to result in an improved line current THD. At this point, the control loop parameter values from the previous iteration are determined to be optimized values. At the step 110, the system commences normal operation under control of the primary side controller executing the control algorithm using the optimized control loop parameter values.

In other embodiments, further refinement of the control loop parameter values can be performed once a present iteration fails to result in an improved line current THD. In some embodiments, a spiral approach can be used. For example, if the control loop parameter values had most recently been incremented, and the resulting line current THD did not improve, then a subsequent iteration can be performed where the control loop parameter values are decremented, but by a small interval than the preceding increments. The resulting line current THD is compared to the previous best configuration as before. Further iterations can be performed where the control loop parameter values are adjusted as increments or decrements in smaller by smaller intervals, thereby spiraling in on optimized control loop parameter values. A predefined criteria is used to conclude the refinement loop. For example, a defined number of refinement iterations can be performed, a minimum increment/decrement interval size is reached, or a minimum inter-iteration improvement in the line current THD is achieved. It is understood that other criteria can be used. In some cases, use of the refinement methodology enables larger increment sizes in the first one or more adjustments.

It is understood that the control loop parameter values, line current THDs, and any other corresponding results and variables associated with each iteration can be stored in memory for look-up and comparison to determine the optimized control loop parameter values. It is also understood that criteria other than the lowest line current THD can be used to determine the better configuration.

The method can be implemented at any time to determine optimized control loop parameter values. For example, the method can be implemented at device power-up, at defined time periods or intervals, or in response to changing operating conditions such as changes in the load, line voltage, or environmental conditions.

The method described above utilizes an evaluation model for optimizing the control loop parameter values used within the control algorithm executed by the primary side controller. The evaluation model utilizes a series of step adjustment of the control loop parameter values to determine optimized values. In the exemplary implementation described above, the evaluation model determines and compares the line current THD corresponding to different control loop parameter values. The evaluation model does not use a small signal model for determining the control loop parameter values, and as such also does not inject white noise into the system for identifying the small signal model, as in conventional approaches.

The evaluation model can be implemented as firmware executed by the primary side controller, or the primary side controller can be have a dedicated design for implementing the evaluation model, or the evaluation model can be implemented through the use of additional or modified hardware. For cost effectiveness, the part of firmware code for processing adaptive parameters' adjustment can be executed in firmware background operation.

The present application has been described in terms of specific embodiments incorporating details to facilitate the understanding of the principles of construction and operation of the method. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A method of adaptively controlling a power supply, the method comprising:
  a. configuring a switching mode power supply to include a transformer having a primary side and a secondary side, a primary side circuit under control of a primary side controller and a secondary side circuit under control of a secondary side controller, wherein the primary side controller controls the primary side circuit using a control algorithm that includes control loop parameters;

b. setting the control loop parameters to default control loop parameter values;

c. determining line current total harmonic distortion corresponding to the default control loop parameter values;

d. adjusting the control loop parameters;

e. determining line current total harmonic distortion corresponding to the adjusted control loop parameters;

f. comparing the line current total harmonic distortion corresponding to the adjusted control loop parameters to the line current total harmonic distortion corresponding to the default control loop parameter values to determine a lowest line current total harmonic distortion;

g. setting optimized control loop parameters using the control loop parameters corresponding to the lowest line current total harmonic distortion; and h. executing the control algorithm using the optimized control loop parameters.

2. The method of claim 1 wherein determining line current total harmonic distortion comprises measuring a line current and applying a Fast Fourier Transform to the measured line current.

3. The method of claim 2 wherein determining line current total harmonic distortion further comprises performing a power spectral density analysis on the Fast Fourier Transform result.

4. The method of claim 1 wherein determining line current total harmonic distortion comprises passing a line current through a set of band pass filters.

5. The method of claim 1 wherein adjusting the control loop parameters comprises increasing or decreasing each control loop parameter by a predefined increment.

6. The method of claim 1 wherein the primary side circuit is configured for power factor correction and AC-to-DC voltage conversion.

7. The method of claim 1 wherein the secondary side circuit is configured for DC-to-DC voltage conversion.

8. A method of adaptively controlling a power supply, the method comprising:

a. configuring a switching mode power supply to include a transformer having a primary side and a secondary side, a primary side circuit under control of a primary side controller and a secondary side circuit under control of a secondary side controller, wherein the primary side controller controls the primary side circuit using a control algorithm that includes control loop parameters;

b. setting the control loop parameters to default control loop parameter values;

c. determining line current total harmonic distortion corresponding to the default control loop parameter values;

d. adjusting the control loop parameters;

e. determining line current total harmonic distortion corresponding to the adjusted control loop parameters;

f. comparing the line current total harmonic distortion corresponding to the adjusted control loop parameters to the line current total harmonic distortion corresponding to the default control loop parameter values to determine a lowest line current total harmonic distortion;

g. setting improved control loop parameters using the control loop parameters corresponding to the lowest line current total harmonic distortion;

h. performing one or more iterations of adjusting the improved control loop parameters for a present iteration, determining a resulting line current total harmonic distortion corresponding to the present iteration, comparing the resulting line current total harmonic distortion of the present iteration to the determined line current total harmonic distortion corresponding to the improved control loop parameters of a previous iteration, and resetting the improved control loop parameters using the control loop parameters corresponding to the lowest line current total harmonic distortion, wherein the one or more iterations are repeated until an optimized criteria is achieved and the improved control loop parameters are set as optimized control loop parameters; and i. executing the control algorithm using the optimized control loop parameters.

9. The method of claim 8 wherein determining line current total harmonic distortion comprises measuring a line current and applying a Fast Fourier Transform to the measured line current.

10. The method of claim 9 wherein determining line current total harmonic distortion further comprises performing a power spectral density analysis on the Fast Fourier Transform result.

11. The method of claim 8 wherein determining line current total harmonic distortion comprises passing a line current through a set of band pass filters.

12. The method of claim 8 wherein the optimized criteria comprises determining that the determined line current total harmonic distortion is less than a line current total harmonic distortion minimum threshold value.

13. The method of claim 8 wherein adjusting the improved control loop parameters for the present iteration comprises increasing or decreasing each improved control loop parameter by a predefined increment.

14. The method of claim 13 wherein the optimized criteria is achieved when a minimum line current total harmonic distortion is determined through successive incrementing and decrementing of the improved control loop parameters.

15. The method of claim 8 wherein adjusting the control loop parameters comprises increasing or decreasing each control loop parameter by a predefined increment.

16. The method of claim 8 wherein the primary side circuit is configured for power factor correction and AC-to-DC voltage conversion.

17. The method of claim 8 wherein the secondary side circuit is configured for DC-to-DC voltage conversion.

18. An apparatus for adaptively controlling a power supply, the apparatus comprising:

a. a switching mode power supply comprising a transformer having a primary side circuit and a secondary side circuit; and b. a primary side controller configured to control the primary side circuit using a control algorithm that includes control loop parameters, wherein the control algorithm is configured to:

i. setting the control loop parameters to default control loop parameter values;

ii. determining line current total harmonic distortion corresponding to the default control loop parameter values;

iii. adjusting the control loop parameters;

iv. determining line current total harmonic distortion corresponding to the adjusted control loop parameters;

v. comparing the line current total harmonic distortion corresponding to the adjusted control loop parameters to the line current total harmonic distortion corresponding to the default control loop parameter values to determine a lowest line current total harmonic distortion;

vii. setting optimized control loop parameters using the control loop parameters corresponding to the lowest line current total harmonic distortion; and viii. executing the control algorithm using the optimized control loop parameters.

19. The apparatus of claim 18 further comprising a secondary side controller configured to control the secondary side circuit.

20. The apparatus of claim 18 wherein the control algorithm is further configured to perform one or more iterations of adjusting the improved control loop parameters for a present iteration, determine a resulting line current total harmonic distortion corresponding to the present iteration, compare the resulting line current total harmonic distortion of the present iteration to the determined line current total harmonic distortion corresponding to the improved control loop parameters of a previous iteration, and reset the improved control loop parameters using the control loop parameters corresponding to the lowest line current total harmonic distortion, wherein the one or more iterations are repeated until an optimized criteria is achieved and the improved control loop parameters are set as optimized control loop parameters.

21. The apparatus of claim 18 wherein the primary side controller is configured to determine line current total harmonic distortion by measuring a line current and applying a Fast Fourier Transform to the measured line current.

22. The apparatus of claim 21 wherein the primary side controller is further configured to determine line current total harmonic distortion by performing a power spectral density analysis on the Fast Fourier Transform result.

23. The apparatus of claim 18 wherein the apparatus further comprises a set of band pass filters and the primary side controller is configured to determine line current total harmonic distortion by passing a line current through the set of band pass filters.

24. The apparatus of claim 18 wherein the primary side controller is configured to adjust the control loop parameters by increasing or decreasing each control loop parameter by a predefined increment.

25. The apparatus of claim 18 wherein the primary side circuit is configured for power factor correction and AC-to-DC voltage conversion.

26. The apparatus of claim 18 wherein the secondary side circuit is configured for DC-to-DC voltage conversion.

* * * * *